US012642747B2

(12) United States Patent
Fujita et al.

(10) Patent No.: US 12,642,747 B2
(45) Date of Patent: Jun. 2, 2026

(54) CAPSULE FILLING APPARATUS

(71) Applicant: QUALICAPS CO., LTD., Yamatokoriyama (JP)

(72) Inventors: Kenji Fujita, Yamatokoriyama (JP); Ryota Kurimoto, Yamatokoriyama (JP); Yu Kimura, Yamatokoriyama (JP); Kenichi Kasai, Yamatokoriyama (JP)

(73) Assignee: QUALICAPS CO., LTD., Yamatokoriyama (JP)

( * ) Notice: Subject to any disclaimer, the term of this patent is extended or adjusted under 35 U.S.C. 154(b) by 0 days.

(21) Appl. No.: 18/871,932

(22) PCT Filed: Nov. 16, 2023

(86) PCT No.: PCT/JP2023/041198
§ 371 (c)(1),
(2) Date: Dec. 5, 2024

(87) PCT Pub. No.: WO2024/135174
PCT Pub. Date: Jun. 27, 2024

(65) Prior Publication Data

US 2025/0325450 A1 Oct. 23, 2025

(30) Foreign Application Priority Data

Dec. 21, 2022 (JP) ................................ 2022-204123

(51) Int. Cl.
*A61J 3/07* (2006.01)
*B65B 37/10* (2006.01)

(52) U.S. Cl.
CPC ............... *A61J 3/074* (2013.01); *B65B 37/10* (2013.01)

(58) Field of Classification Search
CPC .......... A61J 3/074; Y10S 53/90; B65B 37/10; B65B 35/08
See application file for complete search history.

(56) References Cited

U.S. PATENT DOCUMENTS 3,070,932 A * 1/1963 Hofliger .................. A61J 3/074 53/900
5,988,234 A * 11/1999 Wegman .................. B65B 1/12 141/93

(Continued)

FOREIGN PATENT DOCUMENTS

JP 2000-226097 A 8/2000
JP 2015-160613 A 9/2015
JP 2021-041950 A 3/2021

*Primary Examiner* — Andrew M Tecco
*Assistant Examiner* — Nicholas E Igbokwe
(74) *Attorney, Agent, or Firm* — Muncy, Geissler, Olds & Lowe, P.C.

(57) ABSTRACT

Provided is a capsule filling apparatus including: a conveyance body 10 configured to convey a capsule body 30; and a filling unit 20 configured to fill a filling material in the capsule body 30 conveyed to a filling position P, in which the filling unit 20 includes a hopper 21, a holding chamber 22*c*, an auger 23, and a paddle 24, the auger 23 is rotationally driven around a first rotation shaft 23*a* extending in a vertical direction in a hopper 21, the paddle 24 is rotationally driven around a second rotation shaft such that a push-in blade 24*b* slides along an upper surface 11 of the conveyance body 10 in the holding chamber 22*c*, and the first rotation shaft 23*a* and the second rotation shaft are arranged such that axes of the first rotation axis and the second rotation axis coincide with each other.

6 Claims, 3 Drawing Sheets

(56) References Cited

U.S. PATENT DOCUMENTS

| | | | | |
|---|---|---|---|---|
| 6,340,036 | B1 * | 1/2002 | Toyoizumi | B65B 1/12 141/67 |
| 6,640,845 | B1 * | 11/2003 | Wegman | B65B 1/12 141/90 |
| 2009/0140003 | A1 * | 6/2009 | Fontaine | B65B 1/22 222/196 |
| 2014/0238536 | A1 * | 8/2014 | Kumakura | B65D 83/06 141/67 |
| 2018/0178931 | A1 * | 6/2018 | Seno | B65B 1/12 |
| 2019/0233140 | A1 * | 8/2019 | Rapparini | B65B 1/42 |

* cited by examiner

CAPSULE FILLING APPARATUS

TECHNICAL FIELD

The present invention relates to a capsule filling apparatus for filling capsules with a filling material such as powder, granules, or a highly viscous liquid.

BACKGROUND ART

As a conventional capsule filling apparatus, a configuration disclosed in Patent Literature 1 is known, for example. The capsule filling apparatus is configured such that an empty capsule in which a capsule cap and a capsule body are temporarily coupled is supplied to a turntable, and along with rotation of the turntable, separation of the capsule cap and the capsule body, filling of a filling material into the capsule body, and coupling of the capsule cap and the capsule body are sequentially performed.

As illustrated in FIG. 4(*a*) and in FIG. 4(*b*) which is an enlarged view of a main part thereof, filling of the capsule body with the filling material is performed by supplying a filling material 61 by a filling portion 53 into a capsule body 60 accommodated in a pocket 52 of a body disc 51 attached to a turntable 50. The filling portion 53 pressure-feeds the filling material 61 supplied into the chamber 54 to the filling chamber 57 by rotation of an auger (screw) 56 while stirring the filling material by an agitator (stirring arm) 55, and press-fits the filling material into the capsule body 60.

CITATION LIST

Patent Literature

Patent Literature 1: JP 2000-226097 A

SUMMARY OF INVENTION

Technical Problem

While the conventional capsule filling apparatus can adjust a filling amount for the capsule body 60 by increasing or decreasing the rotational speed of the auger 56, the filling amount for each capsule body 60 tends to vary, and thus there is room for improvement in this respect.

Therefore, an object of the present invention is to provide a capsule filling apparatus capable of filling a capsule body with a filling material with high accuracy.

Solution to Problem

The object of the present invention is realized by a capsule filling apparatus including: a conveyance body configured to convey a capsule body to a filling position, the capsule body being accommodated in an accommodation pocket opening in an upper surface; and a filling unit configured to fill a filling material in the capsule body conveyed to the filling position, in which the filling unit includes: a hopper configured to store the filling material, the hopper having a discharge port in a lower portion; a holding chamber configured to hold the filling material between the discharge port and the upper surface of the conveyance body: an auger configured to push out the filling material to the holding chamber through the discharge port by the auger being rotationally driven around a first rotation shaft extending in a vertical direction in the hopper; and a paddle having a push-in blade that presses the filling material within the holding chamber into the capsule body, the paddle is rotationally driven around a second rotation shaft such that the push-in blade moves along the upper surface of the conveyance body in the holding chamber, and the first rotation shaft and the second rotation shaft are arranged such that axes of the first rotation axis and the second rotation axis coincide with each other.

In the capsule filling apparatus, the auger and the paddle are preferably rotationally driven independently of each other. In this configuration, the auger and the paddle are preferably rotationally driven in directions opposite to each other.

Advantageous Effects of Invention

According to the capsule filling apparatus of the present invention, it is possible to perform filling a capsule body with a filling material with high accuracy.

DESCRIPTION OF EMBODIMENT

Figure 1:
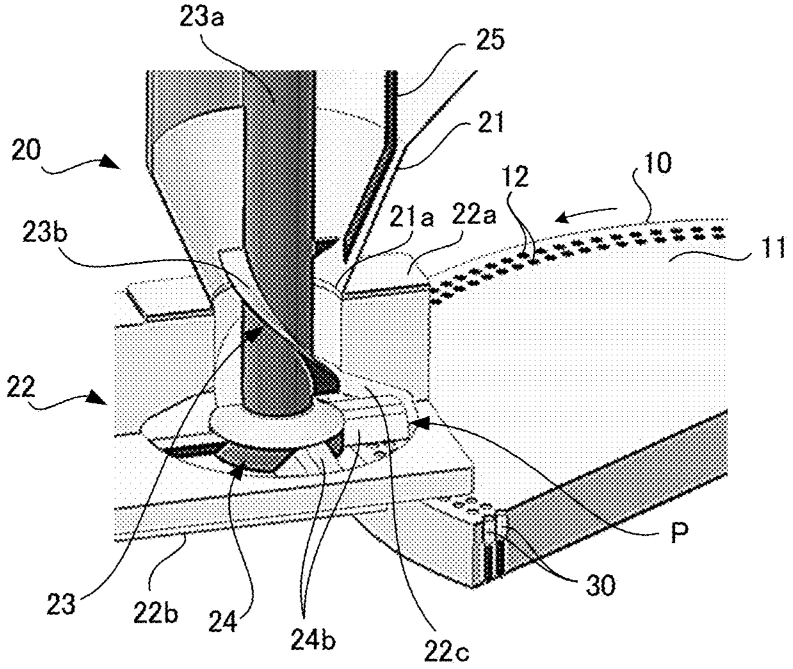
FIG. 1 is a perspective view of a main part of a capsule filling apparatus according to an embodiment of the present invention.

Hereinafter, an embodiment of the present invention will be described with reference to the accompanying drawings. FIG. 1 is a perspective view of a main part of a capsule filling apparatus according to an embodiment of the present invention. Similarly to the conventional capsule filling apparatus, the capsule filling apparatus of the present embodiment is configured to separate a supplied empty capsule into a capsule cap and a capsule body, fill the capsule body with the filling material, and then couple the capsule cap and the capsule body again, and FIG. 1 shows a main part of a configuration of the apparatus for filling the separated capsule body with the filling material. As illustrated in FIG. 1, the capsule filling apparatus of the present embodiment includes a conveyance body 10 that conveys a capsule body 30 to a filling position P, and a filling unit 20 that fills the filling material in the capsule body 30 conveyed to the filling position P.

The conveyance body 10 is a disk-shaped member having a horizontal upper surface 11, and accommodation pockets 12 opening in the upper surface are arranged in two rows along the circumferential direction. The conveyance body 10 is rotationally driven in an arrow direction, and conveys the capsule body 30 accommodated in an accommodation pocket 12 on the upstream side in the conveyance direction (not illustrated) toward the filling position P.

Figure 2:
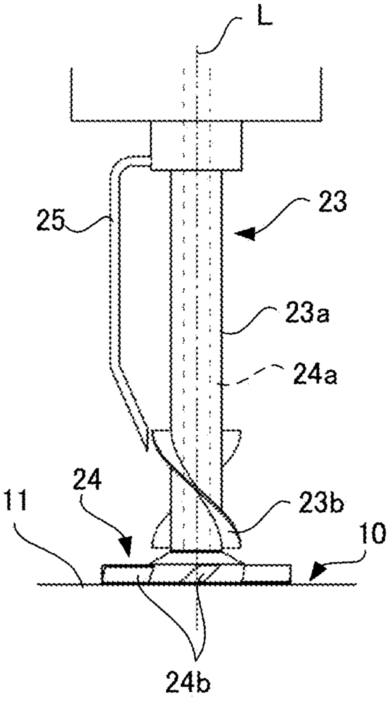
FIG. 2 is a front view illustrating a main part of FIG. 1.
Figure 3:
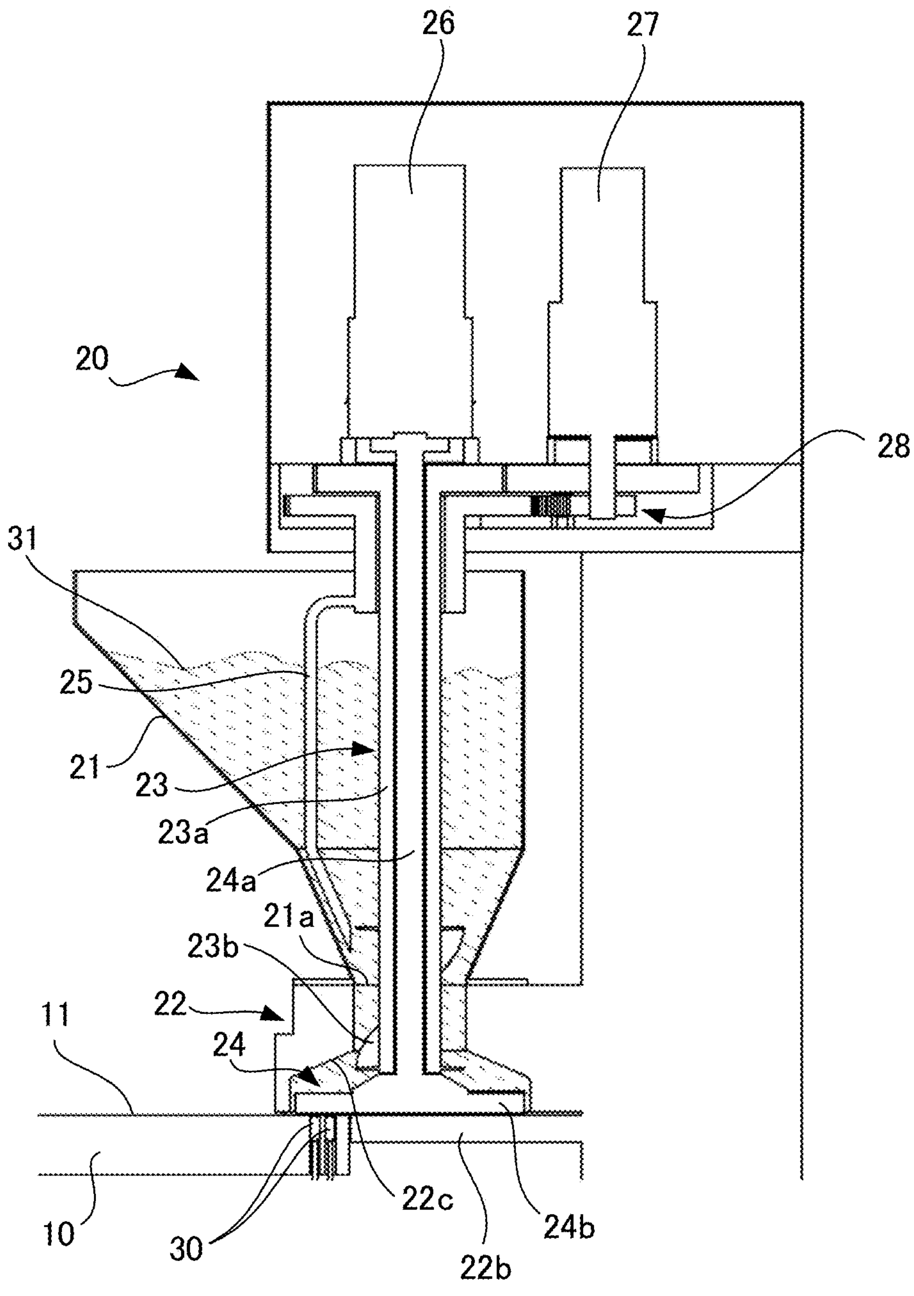
FIG. 3 is a longitudinal sectional view illustrating the main part of FIG. 1.
Figure 4:
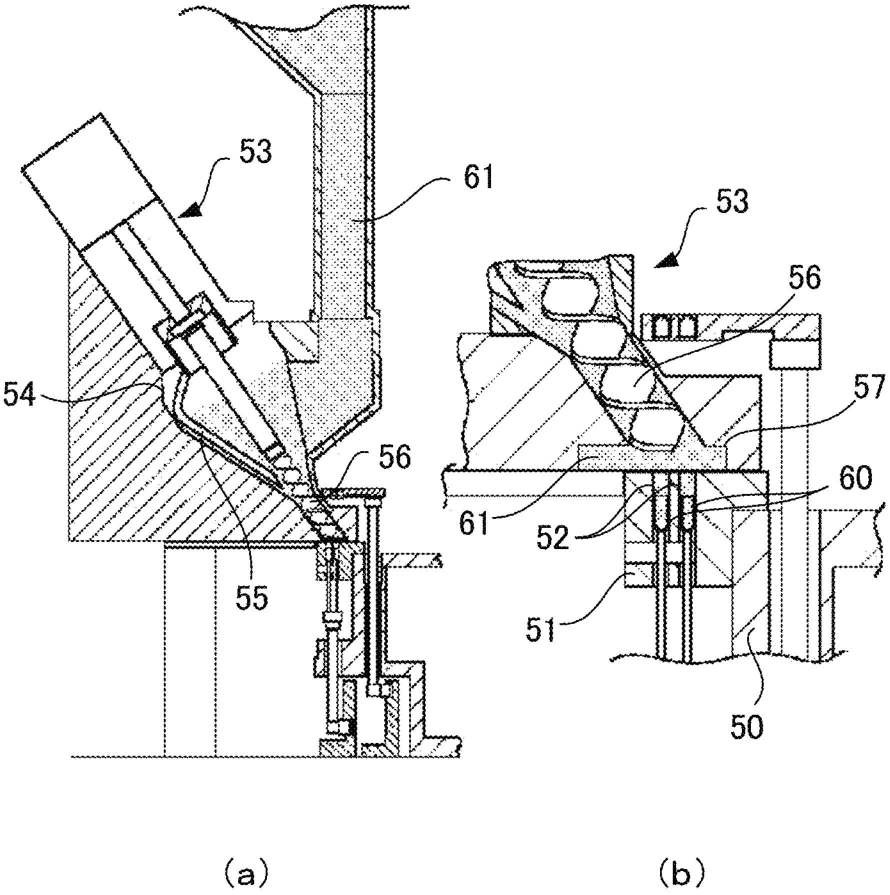
FIG. 4 is a sectional view illustrating a main part of a conventional capsule filling apparatus.

FIG. 2 is a front view of a main part of the filling unit 20, and FIG. 3 is a longitudinal sectional view of the filling unit 20. As illustrated in FIGS. 1 to 3, the filling unit 20 includes a hopper 21, a casing 22, an auger 23, and a paddle 24. The hopper 21 has a discharge port 21*a* in the lower portion, and can store a filling material 31 such as powder, granules, and highly viscous liquid supplied from an upper opening. The casing 22 is disposed immediately below the hopper 21.

The casing 22 is configured such that a horizontal substrate 22*b* is covered with a cover member 22*a*, and a holding chamber 22*c* is provided therein. The holding chamber 22*c* communicates with the discharge port 21*a* via a central opening in the cover member 22*a*, and is configured to expand downward by a tapered portion provided for an inner surface of the cover member 22*a*. The substrate 22*b* is disposed adjacent to the conveyance body 10 such that the upper surface thereof is flush with the conveyance body 10 in the vicinity of the filling position P, and the bottom surface of the holding chamber 22*c* is formed by the upper surface of the substrate 22*b* and the upper surface 11 of the conveyance body 10 facing the filling position P.

The auger 23 includes a hollow cylindrical first rotation shaft 23*a* rotatably supported in the hopper 21 so as to extend in a vertical direction, and a fin 23*b* spirally provided on an outer peripheral surface of the first rotation shaft 23*a*. The fin 23*b* is provided in the vicinity of the discharge port 21*a*, and pushes the filling material 31 stored in the hopper 21 out to the holding chamber 22*c* through the discharge port 21*a* by rotation of the first rotation shaft 23*a*. An upper portion of the first rotation shaft 23*a* is connected to a drive unit 26. The drive unit 26 includes, for example, a servo motor, and can rotationally drive the auger 23 with a desired torque by operation control by the drive unit 26.

A rod-like agitator 25 bent along an inner surface of the hopper 21 is attached to the auger 23. The agitator 25 moves along the inner surface of the hopper 21 along with rotation of the auger 23, and agitates while scraping off the filling material 31.

As illustrated in FIG. 2, the paddle 24 includes a second rotation shaft 24*a* that is disposed in a hollow space of the first rotation shaft 23*a* via a bearing and extends in the vertical direction, and a push-in blade 24*b* provided at a lower end of the second rotation shaft 24*a*. The first rotation shaft 23*a* and the second rotation shaft 24*a* are arranged such that axes L coincide with each other, and are rotatably supported independently of each other. An upper portion of the second rotation shaft 24*a* is connected to a drive unit 27 via a gear unit 28. The drive unit 27 includes, for example, a servo motor, and can rotationally drive the paddle 24 with a desired torque by operation control by the drive unit 27.

More than one push-in blade 24*b* is arranged radially around the second rotation shaft 24*a* so that each of the push-in blades 24*b* horizontally extends from a portion of the second rotation shaft 24*a* protruding below the first rotation shaft 23*a*. Each of the push-in blades 24*b* moves along the substrate 22*b* and the upper surface of the conveyance body 10 along with the rotation of the second rotation shaft 24*a*, and pushes the filling material 31 within the holding chamber 22*c* into the capsule body 30 conveyed to the filling position P. A slight gap (for example, about several mm) may be provided between the push-in blades 24*b* and the substrate 22*b* and the conveyance body 10, or they may be in contact with each other. In order to reliably push the filling material 31 into the capsule body 30, it is preferable that an inclined surface inclined so as to cover the substrate 22*b* and the upper surface of the conveyance body 10 is provided on a front side in a rotation direction of the push-in blades 24*b*. The number of the push-in blades 24*b* is not particularly limited, and may be one.

Since the filling unit 20 of the capsule filling apparatus of the present embodiment is provided with the auger 23 and the paddle 24 arranged such that the axes L coincide with each other, it is possible to realize downsizing of the configuration, and to push the filling material 31 that has been pushed into the holding chamber 22*c* by the operation of the auger 23 into the capsule body 30 reliably by the operation of the paddle 24. This makes it possible to suppress variations in the filling amount while increasing the filling amount of the filling material 31 in the capsule body 30, so that the filling of the filling material in the capsule body can be performed with high accuracy.

The direction of rotation and the speed of rotation of the auger 23 and the paddle 24 may be the same, and in this case, the auger 23 and the paddle 24 may be integrally configured. However, it is preferable that the auger 23 and the paddle 24 are configured to be rotationally driven independently of each other as in the present embodiment. While the rotation speed of the auger 23 greatly affects the filling amount into the capsule body 30, the rotation speed of the paddle 24 greatly affects the variation in the filling amount among the capsule bodies 30, and therefore, by independently controlling the rotation speeds of the auger 23 and the paddle 24, adjustment of the filling amount and adjustment of the variation can be individually optimized, and it is possible to easily perform adjustment regarding the filling.

Although the rotation directions of the auger 23 and the paddle 24 may be the same direction, it is preferable that the rotation directions are opposite to each other. This allows push-in filling of the filling material 31 by the paddle 24 in a state where the filling material 31 is sufficiently stirred by the auger 23, and therefore, it is possible to more easily perform the desired filling. In the present embodiment, as indicated by the arrow in FIG. 1, the auger 23 is rotated clockwise as viewed from above, and the paddle 24 is rotated counterclockwise as viewed from above. However, the auger 23 may be rotated counterclockwise, and the paddle 24 may be rotated clockwise. By combining the control of the rotation directions of the auger 23 and the paddle 24 with the control of the rotation speeds of the auger 23 and the paddle 24 described above, it is possible to perform adjustment regarding the filling more variously.

The rotations of the auger 23 and the paddle 24 may be controlled based on properties of the filling material 31 and the like, and for example, it is possible to perform torque management for the auger 23 and rotation speed management for the paddle 24. As a specific example, in a case where the filling material 31 has a property of easily flowing, the auger 23 is rotated at low torque, and the paddle 24 is rotated at a high rotation speed. In a case where the filling material 31 has a property of not easily flowing, the auger 23 is rotated at high torque, and the paddle 24 is rotated at a high rotation speed.

REFERENCE SIGNS LIST

10 conveyance body
11 upper surface
12 accommodation pocket
20 filling unit
21 hopper
21*a* discharge port
22*c* holding chamber
23*a* first rotation shaft
23 auger
24*a* second rotation shaft
24*b* push-in blade
24 paddle
30 capsule body
31 filling material
P filling position
L axis

The invention claimed is:

1. A capsule filling apparatus comprising:

a conveyance body configured to convey a capsule body to a filling position, the capsule body being accommodated in an accommodation pocket opening in an upper surface; and a filling unit configured to fill a filling material in the capsule body conveyed to the filling position, wherein the filling unit includes:

a hopper configured to store the filling material, the hopper having a discharge port in a lower portion;

a holding chamber configured to hold the filling material between the discharge port and the upper surface of the conveyance body;

an auger having a first rotation shaft extending in a vertical direction and configured to push out the filling material to the holding chamber through the discharge port by the auger being rotationally driven around an axis of the first rotation shaft in the hopper; and a paddle having a second rotation shaft extending in the vertical direction and a push-in blade that presses the filling material within the holding chamber into the capsule body, the paddle is rotationally driven around an axis of the second rotation shaft such that the push-in blade moves along the upper surface of the conveyance body in the holding chamber, the first rotation shaft and the second rotation shaft are arranged such that the axes of the first rotation shaft and the second rotation shaft coincide with each other, the first rotation shaft has a tubular shape with a hollow space penetrating thereinside through the vertical direction, the second rotation shaft is arranged in the hollow space of the first rotation shaft with a lower end of the second rotation shaft projecting downward from the first rotation shaft, and the push-in blade of the paddle is provided on the lower end of the second rotation shaft.

2. The capsule filling apparatus according to claim 1, wherein the auger and the paddle are rotationally driven independently of each other.

3. The capsule filling apparatus according to claim 2, wherein the auger and the paddle are rotationally driven in directions opposite to each other.

4. The capsule filling apparatus according to claim 3, further comprising a first drive unit configured to rotate the first rotation shaft around its axis, and a second drive unit, which is different from the first drive unit, configured to rotate the second rotation shaft around its axis.

5. The capsule filling apparatus according to claim 2, further comprising a first drive unit configured to rotate the first rotation shaft around its axis, and a second drive unit, which is different from the first drive unit, configured to rotate the second rotation shaft around its axis.

6. The capsule filling apparatus according to claim 1, wherein the push-in blade comprises one or more blades each of which faces the upper surface of the conveyance body, and when two or more of the blades are provided, these blades are arranged at predetermined intervals in a circumferential direction around the second rotation shaft.

* * * * *